United States Patent
Polasky

(10) Patent No.: US 9,536,635 B2
(45) Date of Patent: Jan. 3, 2017

(54) INSULATED WIRE CONSTRUCTION FOR FIRE SAFETY CABLE

(71) Applicant: WIRE HOLDINGS LLC, Cleveland, OH (US)

(72) Inventor: Daniel Polasky, Aurora, OH (US)

(73) Assignee: Wire Holdings LLC, Cleveland, OH (US)

( * ) Notice: Subject to any disclaimer, the term of this patent is extended or adjusted under 35 U.S.C. 154(b) by 34 days.

(21) Appl. No.: 14/013,555

(22) Filed: Aug. 29, 2013

(65) Prior Publication Data

US 2015/0060106 A1    Mar. 5, 2015

(51) Int. Cl.
*H01B 7/295* (2006.01)
*H01B 3/28* (2006.01)
*H01B 3/46* (2006.01)

(52) U.S. Cl.
CPC . *H01B 3/28* (2013.01); *H01B 3/46* (2013.01)

(58) Field of Classification Search
CPC ....................................................... H01B 7/295
USPC ......................................... 174/120 R, 121 A
See application file for complete search history.

(56) References Cited

U.S. PATENT DOCUMENTS

| | | | |
|---|---|---|---|
| 3,576,940 A | 5/1971 | Stone et al. | |
| 5,173,960 A | 12/1992 | Dickinson | |
| 5,597,981 A | 1/1997 | Hinoshita et al. | |
| 6,387,518 B1 | 5/2002 | Wolfer et al. | |
| 7,049,524 B2 | 5/2006 | Belli et al. | |
| 7,271,341 B2 | 9/2007 | Jerschow | |
| 7,304,245 B2 | 12/2007 | Alexander et al. | |
| 7,563,855 B2 | 7/2009 | Jerschow et al. | |
| 7,799,998 B2 | 9/2010 | Alexander | |
| 2003/0055157 A1 | 3/2003 | Wolfer et al. | |
| 2005/0045368 A1 | 3/2005 | Keogh | |
| 2005/0205290 A1 | 9/2005 | Pinacci et al. | |
| 2005/0215669 A1 | 9/2005 | Wolfer et al. | |
| 2006/0175075 A1* | 8/2006 | Konnik | H01B 3/46 174/110 R |
| 2009/0133897 A1* | 5/2009 | Jorand et al. | 174/113 R |
| 2009/0301750 A1 | 12/2009 | George et al. | |
| 2010/0119833 A1 | 5/2010 | Madsen et al. | |
| 2012/0040138 A1 | 2/2012 | Weidinger et al. | |
| 2013/0309295 A1* | 11/2013 | Gatenholm | 424/444 |
| 2014/0008098 A1* | 1/2014 | Scaglione | H01B 7/18 174/107 |

FOREIGN PATENT DOCUMENTS

| | | |
|---|---|---|
| CA | 2 291 460 | 10/2006 |
| EP | 0 559 382 | 9/1993 |
| EP | 2 420 532 | 2/2012 |
| RU | 996 52 | 11/2010 |
| RU | 118 109 | 7/2012 |

(Continued)

OTHER PUBLICATIONS

International Search Report, PCT/US2014/053488, Dec. 11, 2014.

*Primary Examiner* — Chau N Nguyen
(74) *Attorney, Agent, or Firm* — Emerson Thomson Bennett, LLC; Daniel A. Thomson

(57) ABSTRACT

An electric wire includes a metal conductor, a first insulation layer, wherein the first layer is a non-ceramifiable silicone compound, and a second insulation layer, wherein the second layer is a ceramifiable silicone compound, wherein the second layer is on the outside of the first layer.

26 Claims, 5 Drawing Sheets

(56) References Cited

FOREIGN PATENT DOCUMENTS

| WO | 00 17889 | | 3/2000 |
|---|---|---|---|
| WO | WO-2004/013255 | * | 2/2004 |
| WO | 2007 004132 | | 1/2007 |

* cited by examiner

INSULATED WIRE CONSTRUCTION FOR FIRE SAFETY CABLE

I. BACKGROUND

A. Field

This invention generally relates to methods and apparatuses for electrical wire, and more particularly to insulated wire for fire safety cable.

B. Description of the Related Art

Fire safety cable [critical circuit-integrity cable] finds application in providing electrical power to equipment and systems that are required to function during a fire. These systems may include fire alarm controllers, fire suppression equipment, sprinkler pumps in high rise buildings or other environments. This equipment needs to operate for a sufficient period of time to allow the safe evacuation of people the location of the fire.

Fire performance cables are required to continue to operate and provide circuit integrity when they are subjected to fire. To meet some of the standards, cables must typically maintain electrical circuit integrity when heated to a specified temperature (e.g. 650, 750, 950, 1050° C.) in a prescribed way for a specified time (e.g. 15 minutes, 30 minutes, 60 minutes, 2 hours). In some cases the cables are subjected to regular mechanical shocks, before, during and after the heating stage. Often they are also subjected to water jet or spray, either in the latter stages of the heating cycle or after the heating stage in order to gage their performance against other factors likely to be experienced during a fire.

These requirements for fire performance cables have been met previously by wrapping the conductor of the cable with tape made with glass fibers and treated with mica. Such tapes are wrapped around the conductor during production and then at least one insulative layer is subsequently applied. Upon being exposed to increasing temperatures, the outer insulative layers are degraded and fall away, but the glass fibers hold the mica in place. These tapes have been found to be effective for maintaining circuit integrity in fires, but because of the additional manufacturing steps they are quite expensive to produce. Further the process of wrapping the tape around the cable is relatively slow compared to other cable production steps and thus, wrapping the tape slows overall production of the cable further adding to the costs. Attempts have been made to reduce the costs by avoiding the use of tape and extruding a cable coating consisting of a flexible polymeric composition which forms an insulating ceramic when exposed to fire to provide the continuing circuit integrity.

In the past the electrical power was provided through the use of mineral insulated cable. This cable required a very complex installation and retrofitting the existing structure was difficult and cost prohibitive. More recently, new and improved wire insulation material has been introduced for the safety cable (critical circuit) application. Today the material of choice for wire insulation is a silicone rubber that has been specially formulated to form a ceramic-like layer when heated to the temperatures that are present in a fire.

The wire construction for safety cable (CI—"circuit integrity") is typically a copper conductor. Over the copper conductor is applied the ceramifiable silicon rubber insulation. A jacket material is applied over the silicone insulation to provide mechanical protection during installation. While the ceramifiable insulation performs adequately in a fire, this material is marginal for other electrical requirements for the cable. One safety cable (CI) requirement for this family of cables is a fire test where the cables are installed in a manufacturer's specified system, and then tested for functionality in a furnace that models petroleum-fueled fire. In one test protocol the furnace is programmed to subject the test samples to a temperature rise on ambient to 1010° C. over a period of 2 hours. During this test the cables are energized to the voltage appropriate to the cables specified application. One test used is UL 2196 for 2 hours. To meet the requirements of the UL2196 test, electrical functionality must be maintained throughout the 2 hours and the following simulated fire hose water spray test.

The UL2196 test method described in these requirements is intended to evaluate the fire resistive performance of electrical cables as measured by functionality during a period of fire exposure, and following exposure to a hose stream. To maintain the functionality of electrical cables during a fire exposure the cables are tested using a fire resistive barrier. The fire resistive barrier is the cable jacketing if the jacketing is designed to provide fire resistance. If the cable jacketing is not designed to provide fire resistance, the electrical cables are either placed within a fire resistive barrier or installed within an hourly rated fire resistive assembly. Fire resistive cables intended to be installed with a non-fire resistive barrier (such as conduit) are tested with the non-fire resistive barrier included as part of the test specimen. Otherwise fire resistive cables incorporating a fire resistive jacket are tested without any barrier. To demonstrate each cable's ability to function during the test, voltage and current are applied to the cable during the fire exposure portion of the test, and the electrical and visual performance of the cable is monitored. The cable is not energized during the hose spray, but it is visually inspected and electrically tested after the hose spray. The functionality during a fire exposure of non-fire resistive electrical cables which are intended for installation within fire barriers or for installation within hourly rated fire resistive assemblies is determined by tests conducted in accordance with the UL Outline of Investigation for Fire Tests for Electrical Circuit Protective Systems, Subject 1724. Two fire exposures are defined: a normal temperature rise fire and a rapid temperature rise fire. The normal temperature rise fire is intended to represent a fully developed interior building fire. The rapid temperature rise fire is intended to represent a hydrocarbon pool fire. Two hose stream exposures are defined: a normal impact hose stream and a low impact hose stream. The low impact hose stream is applied only to cable intended to contain the identifying suffix "CI" to identify it as CI cable in accordance with the Standard for Cables for Power-Limited Fire-Alarm Circuits, UL 1424, and in accordance with the Standard for Cables for Non-Power-Limited Fire-Alarm Circuits, UL 1425. In addition to fire alarm cables referenced in UL 1424 and UL1425, power cables can also be approved for CI (critical circuit) applications. These power cables must meet the performance requirements listed in UL 44. Type RHH, RHW2, RHW and others of this standard if able to pass UL2196 can be qualified for CI applications.

In addition to the UL 2196 test, the safety cable (CI) must also meet the electrical requirements for non-CI rated cable. One of the requirements for this family of cables is long term insulation resistance. For this test, a copper conductor, with only the silicone rubber used as insulation, is tested at the specified voltage while the cable is immersed in 90° C. water. The insulation resistance is monitored periodically. The decrease in resistance must level out at a value above the minimum required. One of the requirements is specified in UL 44. The ceramifiable silicone rubber used in this application is a compound supplied by Wacker. They are a major supplier for insulation compounds for safety cable (CI). This compound can pass the requirements of UL 2196, but is marginal to unable to meet the requirements of UL 44 for insulation resistance long term in 90° C. water at rated voltage.

This UL44 test specifies the requirements for single-conductor and multiple-conductor thermoset-insulated wires and cables rated 600 V, 1000 V, 2000 V, and 5000 V, for use in accordance with the rules of the *Canadian Electrical Code* (*CEC*), *Part* 1, CSA C22.1, in Canada, *Standard for Electrical Installations*, NOM-001-SEDE, in Mexico, and the *National Electrical Code* (*NEC*), NFPA-70, in the United States of America.

Uncured silicone rubber contains polymers of different chain lengths. It comprises a principal silicon-oxygen chain (the siloxane backbone) and an organic moiety bound to the silicon. A silicon atom has four valence electrons, which is why silicon rubber is often abbreviated with a Q for "quaternary group." The properties of silicone rubber vary greatly depending on the organic groups and the chemical structure. The organic groups may be methyl, vinyl, phenyl, or other groups. Depending on which organic groups are present, silicone polymers in common use are classified as follows: MQ, or polydimethylsiloxane (PDMS), denotes a polymer in which two methyl groups are bound to the siloxane backbone; VMQ stands for polydimethylsiloxane in which a small number of methyl groups have been replaced by vinyl groups; PVMQ stands for a VMQ in which a small number of methyl groups have been replaced by phenyl groups; and FVMQ stands for a VMQ in which a small number of methyl groups have been replaced by trifluoropropyl substituents.

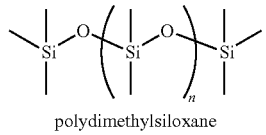
polydimethylsiloxane

Ceramifying polymer materials have been developed by incorporating ceramic forming pre-cursors into thermoplastics. These compounds can be processed on conventional plastic extrusion equipment to form sheets, profiles or coatings. In a fire situation, the polymer component is quickly pyrolized. However, a porous, coherent ceramic begins to form at sufficiently low temperatures to maintain the structural integrity of the material through to temperatures of over 1000° C. The ceramic forming systems can be adjusted to minimize dimensional changes, or to provide a degree of intumescence through entrapment of volatile gases from the polymer. This can produce a cellular structure with increased thermal resistance. Ceramifying polymer technology has already been commercialized for fire resistant cable coatings and shows promise for many other fire protection coating applications.

Ceramifying polymers generally consist of a polymer matrix with refractory silicate minerals which form the ceramic framework in combination with a flux system. This can allow a coherent ceramic structure to form at a relatively low temperature. Other functional additives may be added including stabilizers and flame retardants. Although the total ceramifying additive level must be quite high, the materials can still be processed like conventional plastics. A wide range of ceramifying polymers can be produced, including thermoplastics and emulsions suitable for coatings. Ceramification can be combined with intumescence through a mechanism which traps volatiles from the polymer decomposition as the ceramic structure is formed. This can produce a strong, cellular coating layer with good thermal resistance for fire protection applications.

Ceramifying polymers are not inherently flame retardant. However, they can be modified with organic or inorganic flame retardant systems to achieve low flammability ratings. Ceramification can also assist fire performance by producing a stable surface layer which insulates the underlying layers and may inhibit volatile emissions. This can delay ignition and reduce heat release rates.

Most polymers begin to decompose through oxidative reactions at temperatures of around 200° C. Higher performance polymers such as silicones persist to over 300° C. But typical fire tests require exposure to a temperature profile based on the combustion of a cellulose fuel load in a representative room. This reaches 700° C. in about 10 minutes at which all polymers, including silicones, rapidly decompose. The temperature continues to increase to 1000° C. after 1 hour. Hence, conventional polymers are generally unable to provide a barrier to fire, or thermal insulation, in systems which require a rating of 60 minutes or longer in these tests. These fire ratings are usually achieved by using intumescent materials, which produce an inorganic char with limited cohesive strength, or thick protective structures made from gypsum board or similar materials.

A characteristic of ceramifying polymers is their ability to form a self-supporting structure throughout the temperature range from ambient service temperature to over 1000° C. Reactions in the inorganic ceramic forming systems can commence from temperatures as low as 350° C. and continue to 800° C. or higher. This is achieved with fluxes which produce a controlled, low level of liquid phase at these temperatures. Ceramification in these materials is not simply the bonding or fusing of the silicate particles by a viscous liquid phase, such as with relatively high levels of low melting point glasses. Such materials tend to collapse at high temperatures and are not self-supporting. Ceramification involves reaction sintering assisted by the controlled level of liquid phase.

Solid silicone rubber contains polymers with a high molecular weight and relatively long polymer chains. Silicones are characterized by a fully saturated backbone of alternating silicon and oxygen atoms. The Si—O links in the chain have an exceptionally high bond energy of 451 kJ/mol. C—C links, by comparison, have a bond energy of 352 kJ/mol. The Si—O chain mobility is very high. The organic side groups shield the backbone, so surface energy is low.

Crosslinkers are typically utilized to convert the raw rubber into a mechanically stable cured product. Use is made of peroxide or platinum catalyst systems. Fillers are also used to reinforce the elastic silicone network. Peroxide curing involves the use of organic peroxides. At elevated temperatures, they decompose to form highly reactive radicals which chemically crosslink the polymer chains. The result is a highly elastic, three-dimensional network. During platinum-catalyzed addition curing, the crosslinker's Si—H groups react with the vinyl groups of the polymer to form a three-dimensional network.

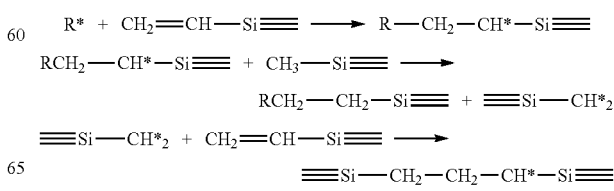

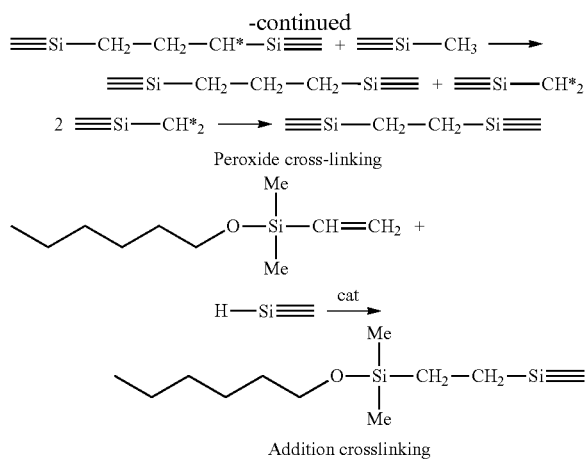

Addition crosslinking

II. SUMMARY

In accordance with one aspect of the invention, an electric wire includes a metal conductor, a first insulation layer, wherein the first layer is a non-ceramifiable silicone compound, an optional fiber layer, and a second insulation layer, wherein the second layer is a ceramifiable silicone compound, wherein the second layer is on the outside of the first layer.

In accordance with another aspect of the invention, the first and second layers are coextruded into inseparable layers.

In accordance with another aspect of the invention, the non-ceramifiable layer has an acceptable 90° C. wet insulation resistance and reduced current leakage at 1850° F. when co-extruded and bonded with the ceramifiable silicone layer.

In accordance with another aspect of the invention, the first layer has a diameter of between about 10% to about 40% of the diameter of the combined first and second layers.

In accordance with another aspect of the invention, the thickness of the layers can be as low as about 40 mils.

In accordance with another aspect of the invention, the first layer is between about 5 mils and about 15 mils and the second layer is between about 30 mils and about 40 mils.

In accordance with another aspect of the invention, the first layer is between about 10 mils to about 12 mils and the second layer is about 20 mils.

In accordance with another aspect of the invention, the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$.

In accordance with another aspect of the invention, the first insulation layer is addition cured or peroxide cured.

In accordance with another aspect of the invention, the second insulation layer is addition cured or peroxide cured.

In accordance with another aspect of the invention, the wire has an extruded jacket over the first and second insulation layers.

In accordance with another aspect of the invention, the silicone compound is a polyorganosiloxane and is crosslinked with a peroxide compound or a crosslinking agent.

In accordance with another aspect of the invention, the ceramifiable silicone compound is a polydimethylsiloxane and has a density of about 1.05 to about 1.60 g/cm$^3$, a Shore A hardness of about 3 to about 90, a tensile strength of about 5 to about 11 N/mm$^2$, an elongation at break of about 100% to about 1,100%, a tear strength of about 5 to about 55 N/mm, a compression set of about 5 to about 25%, and a rebound resilience of about 30% to about 70%.

In accordance with another aspect of the invention, the ceramifiable silicone compound is a polydimethylsiloxane and has a density of about 1.20 to about 1.29 g/cm$^3$, a Shore A hardness of about 70 to about 72, a tensile strength of about 6.6 to about 9 N/mm$^2$, an elongation at break of about 330% to about 430%, and a tear strength of about 18 to about 26 N/mm.

In accordance with another aspect of the invention, the non-ceramifiable silicone compound is a polyorganosiloxane.

In accordance with another aspect of the invention, the non-ceramifiable silicone compound is a polydimethylsiloxane.

In accordance with another aspect of the invention, an electric wire includes a metal conductor, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$, wherein the first layer has an acceptable 90° C. wet insulation resistance and reduced current leakage at 1850° F. when co-extruded and bonded with the ceramifiable silicone layer, a first insulation layer, wherein the first layer is a non-ceramifiable platinum-cured polydimethylsiloxane, wherein the first layer is between about 10 mils to about 12 mils, a second insulation layer, wherein the second layer is a ceramifiable peroxide-cured polydimethylsiloxane, wherein the second layer is on the outside of the first layer, wherein the second layer is about 35 mils, wherein the first and second layer are coextruded into inseparable layers, wherein the thickness of the layers can be as low as about 45 mils, and an extruded jacket, wherein the extruded jacket covers the layers.

In accordance with another aspect of the invention, an electric wire includes a metal conductor, a first insulation layer, wherein the first layer is a ceramifiable silicone compound, an optional fiber layer, and a second insulation layer, wherein the second layer is a non-ceramifiable silicone compound, wherein the second layer is on the outside of the first layer.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein:

FIG. 1 shows a cross-sectional view of the wire;
FIG. 2 shows a cut away perspective view of the wire;
FIG. 3 shows the curing process;
FIG. 4 shows a cross-sectional view of another embodiment of the wire; and,
FIG. 5 shows a cut away perspective view of the wire;
FIG. 6 shows a cross-sectional view of the wire with a third insulation layer;

IV. DETAILED DESCRIPTION

Figure 1:
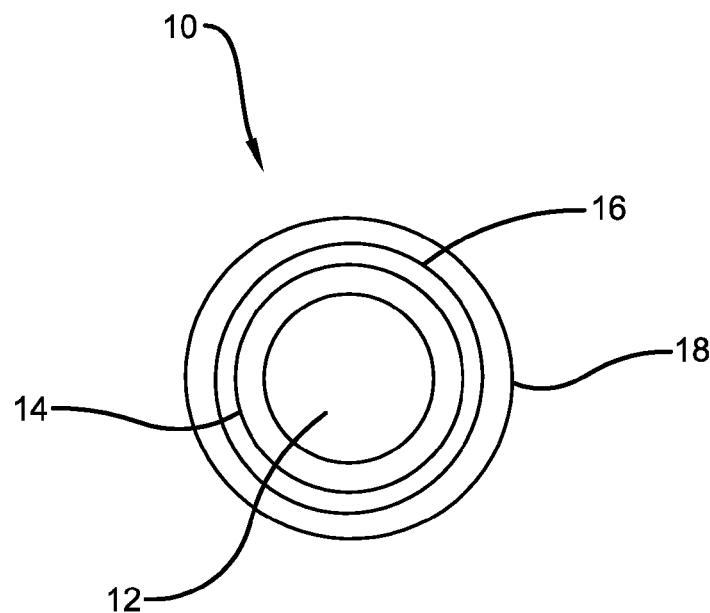
Figure 2:
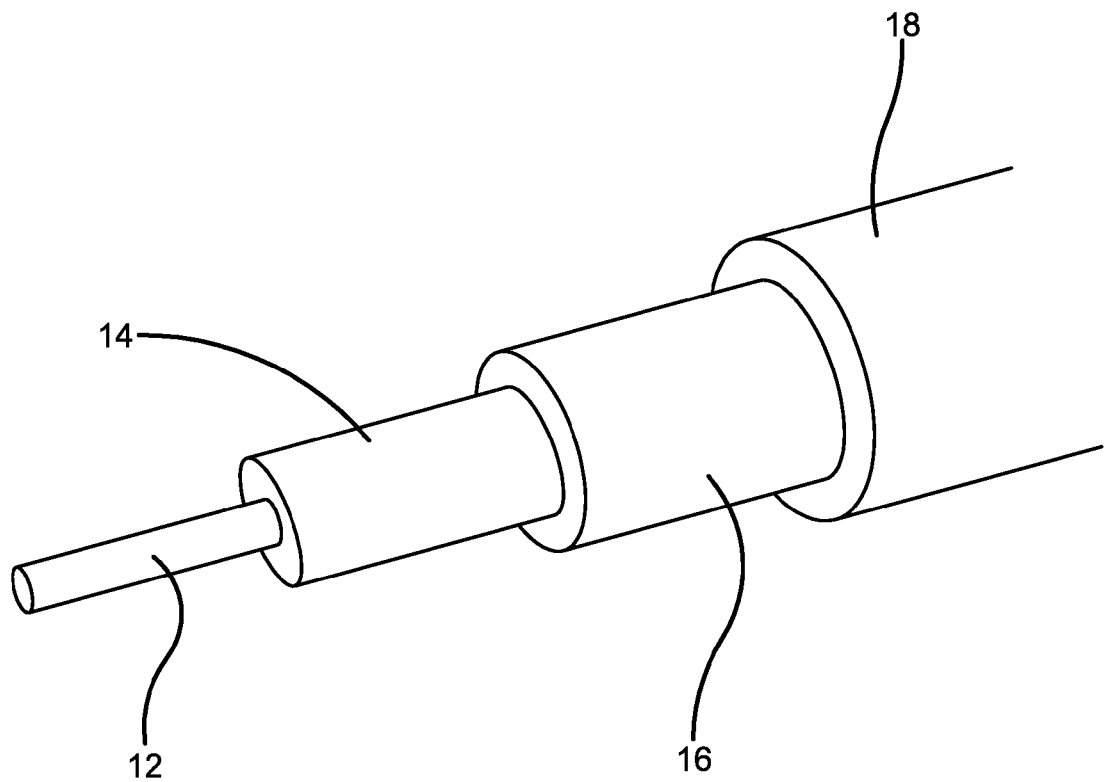
Figure 3:
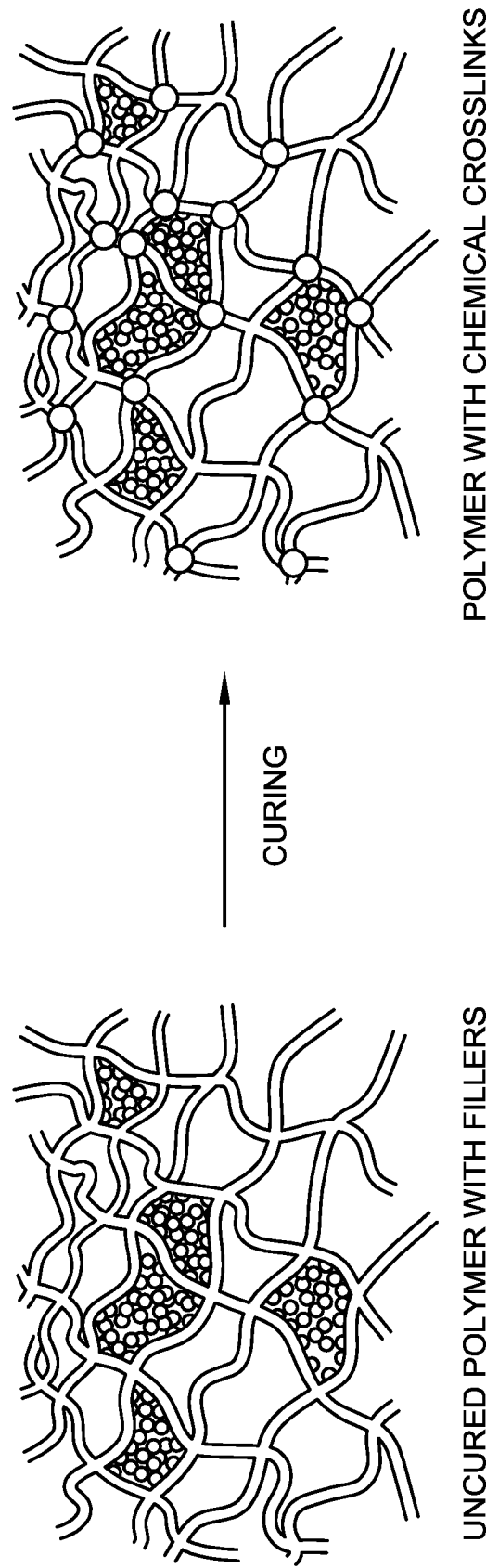

In reference to the FIGS. 1-5, a wire 10 includes a conductor 12, a first non-ceramifiable layer 14, a second ceramifiable layer 16, and an extruded jacket 18. The ceramifiable layer 16 can be a silicone rubber, which, alone, does not have acceptable long term insulation in 90° C. water. However, some other methyl vinyl silicone compounds used in wire and cable applications are able to meet the insulation requirements in water at 90° C. It has been found that the silicone insulation over the copper conductor 12 can be coextruded in two layers. The two layers 14, 16, the first a non-ceramifiable silicone compound, and the second a ceramifiable silicone compound, are joined in their uncured state within the co-extrusion tooling (not shown). The layers 14, 16 are applied concentrically and are composed of two concentric layers. In one example, each layer is crosslinked by a peroxide or addition crosslinker. When crosslinked, the two layers 14, 16 bonded together intimately and are inseparable and act as one insulation layer. The first layer 14 is selected from the available wire and cable silicone insulating compounds that are not ceramifiable and have acceptable 90° C. wet insulation resistance and reduced current leakage at 1850° F. when co-extruded and bonded with the ceramifiable silicone layer. The second or outer layer 16 is a ceramifiable compound. The percentage of the inner layer 14 to the total insulation wall is from about 10% to about 40% (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40). A non-limiting example of the silicone compounds used for the layers 14, 16 are non-ceramifiable polydimethylsiloxane and ceramifiable polydimethylsiloxane. A suitable jacket 18, such as a thermoset material or thermoplastic, is extruded onto the layers 14, 16. In one example, the jacket 18 is made of a fire resistant polyethylene, which can be Megolon™ provided by AlphaGary, Ltd.

EXAMPLE

In one example, the non-ceramifiable layer 14 is chosen from Elastosil® 533/60 from Wacker Chemie AG, Xiameter® RBB-2340 Series from Dow Corning Corporation, and any UL class 22 silicone compound. Elastosil® 533/60 is a platinum crosslinked polydimethylsiloxane, Xiameter® RBB-2340 Series is a peroxide cured polydimethylsiloxane, cured with either 1.3 pph or 1.5 pph 2,4-dichlorobenzoyl peroxide, 50% active, or with 1.0 pph 2,5 Bis(t-butylperoxy)-2,5 dimethylhexane, 45% active, and UL class 22 silicone compounds are silicone compounds as described in Table 50.210 of UL 1581. In this example, the ceramifiable layer 16 is chosen from Elastosil® 502/75 and Elastosil® 512/70, both from Wacker Chemie AG. Elastosil® 502/75 is a ceramifiable HCR (high consistency rubber) silicone, which is a polydimethylsiloxane with vinyl groups, and is crosslinked with 1.8% Bis(2,4-dichlorobenzoyl)peroxide, 50% active, or with 1.2% 2,5 Bis(t-butylperoxy)-2,5 dimethylhexane, 45% active. Elastosil® 512/70 is a ceramifiable HCR silicone, which is a polydimethylsiloxane, and is crosslinked with 1.8% Bis(2,4-dichlorobenzoyl)peroxide, 50% active, or with 1.2% 2,5 Bis(t-butylperoxy)-2,5 dimethylhexane, 45% active. It is to be understood, however, that any ceramifiable silicone compound could be used for the ceramifiable layer 16, and any non-ceramifiable silicone could be used for the non-ceramifiable layer 14.

Surprisingly, significant improvement in the wet 90° C. insulation test has been achieved over the single layer insulation. Further, in testing designed to model the UL 2196 test, it has been found that the coextruded product has achieved improved performance at temperatures up to 1010° C. Non coextruded insulation at about 1.14 mm (0.045") and about 1.4 mm (0.055") has been unable to pass 600 vac at temperatures up to 1010° C. for 2 Hrs. Unexpectedly, both 1.14 mm (0.045") and 1.4 mm (0.055") passed 1010° C. at 2 Hrs. In addition, the ceramifiable insulation layer 16 had significantly less cracking in the coextruded form than with a single extrusion. Additionally and unexpectedly, current leakage values for the coextruded insulation, recorded during UL 2196 testing were 30% to 56% less than single layer insulation constructions including those with a mica tape wrapped conductor or a LSZH layer. Previously, to meet 600 vac for the UL 2196 test the conductor needed to be mica taped wrapped and coated with a sacrificial LSZH ("low smoke zero halogen") plastic compound to pass.

Figure 4:
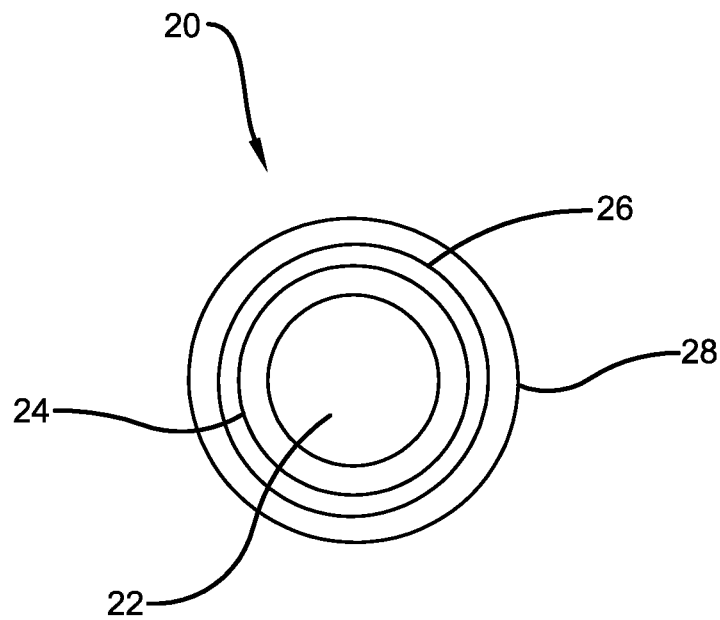
Figure 5:
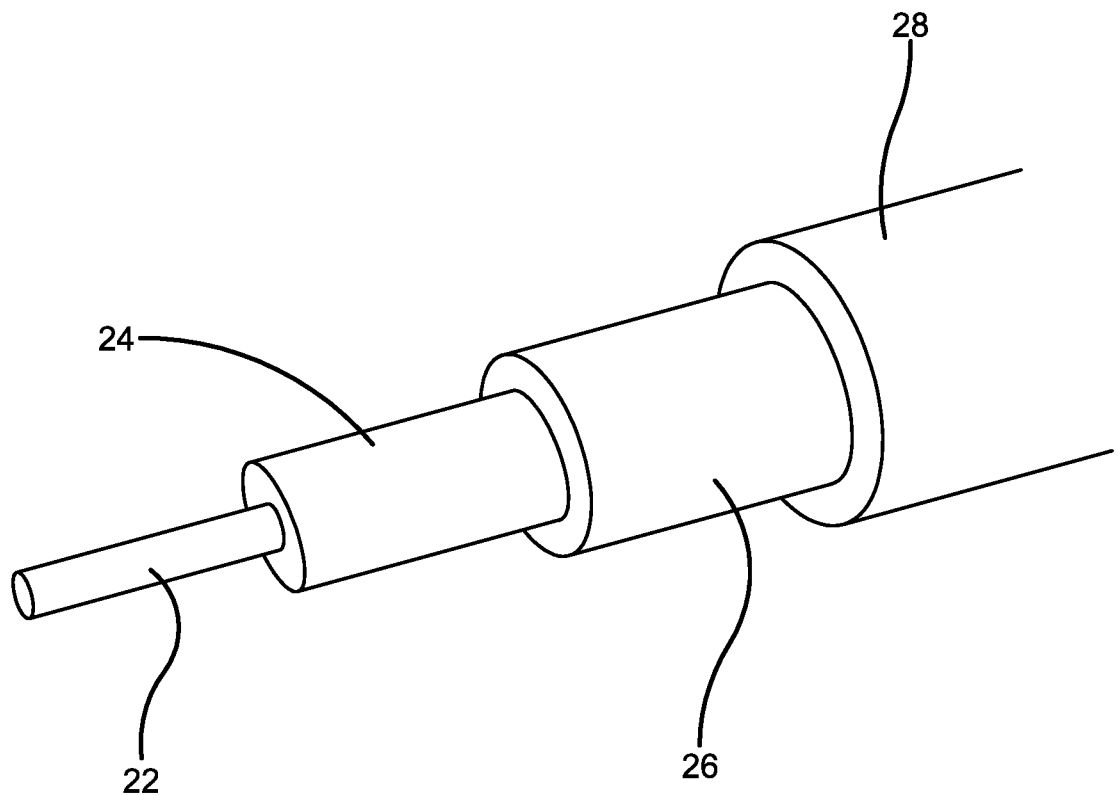
Figure 6:
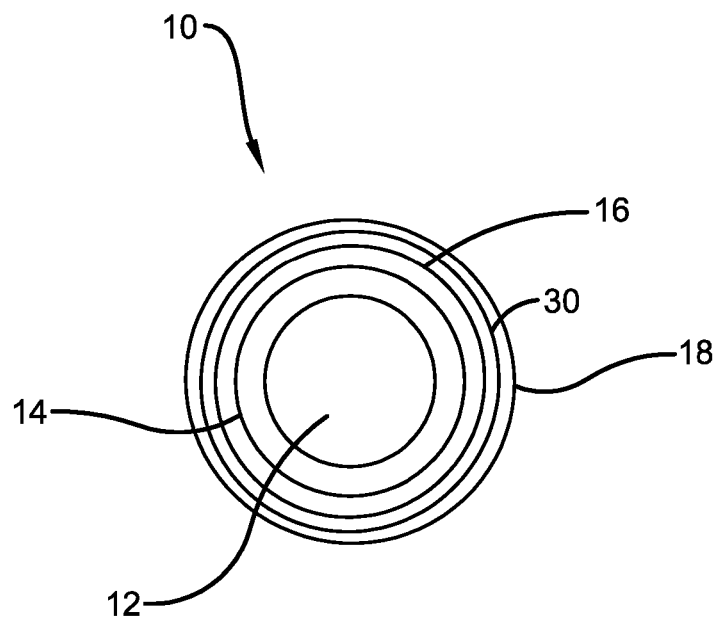
Figure 7:
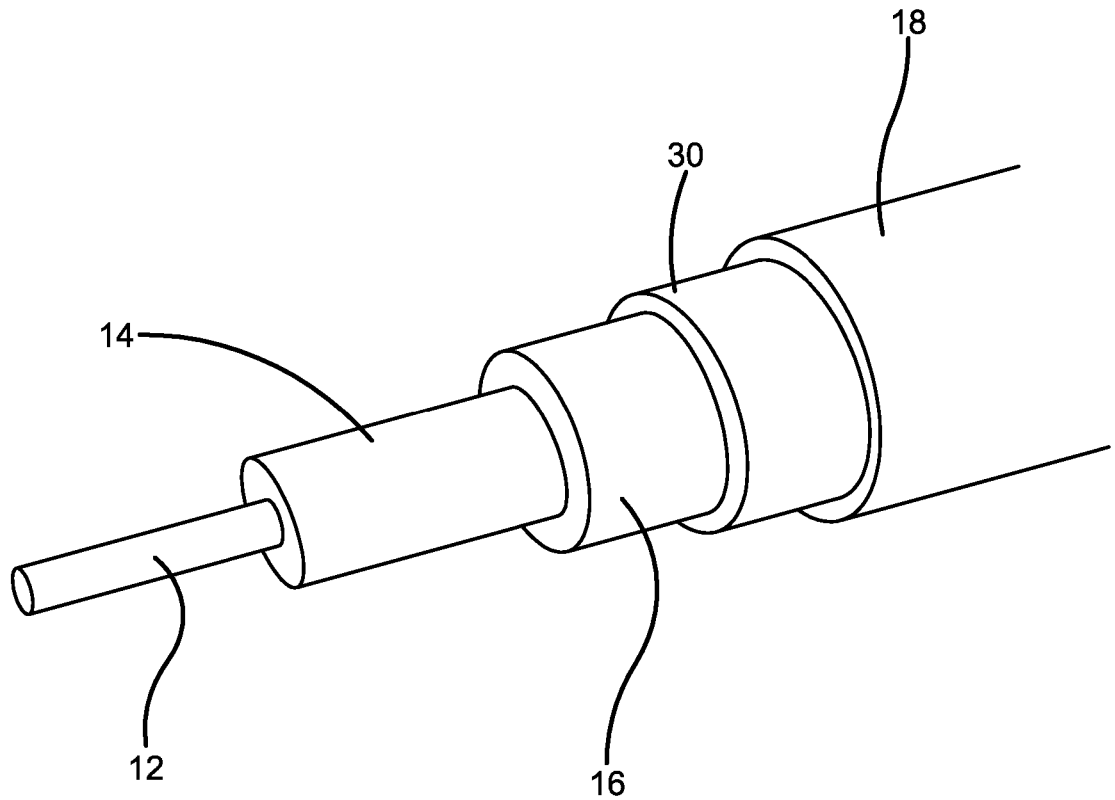
FIG. 7 shows a cut-away view of the wire with a third insulation layer.

With continuing reference to FIG. 1-8, the total width of the first and second layers 14, 16 is less than or equal to about 45 mils. In one example, the first layer 14 has a width of about 5 to about 15 mils (including, but not limited to, 5, 6, 7, 8, 9, 10, 11, 12, 13, 14, and 15) and the second layer has a width of about 30 to about 40 mils (including, but not limited to, 30, 31, 32, 33, 34, 35, 36, 37, 38, 39, and 40). In another example, the first layer 14 has a width of about 10 to about 12 mils (including, but not limited to, 10, 11, and 12) and the second layer has a width of about 33 to about 35 mils (including, but not limited to, 33, 34, and 35). The conductor 12 can be a single conductor cable between 18 gauge AWG (cross-section area of 0.823 mm$^2$) and 500 MCM (cross-section area of 235.35 mm$^2$), and can be stranded or solid. In one example, the conductor is chosen from copper, silver plated copper, nickel plated copper, and nickel. FIGS. 6 and 7 show an embodiment having a third insulation layer 30 on top of the second layer 16.

Figure 8:
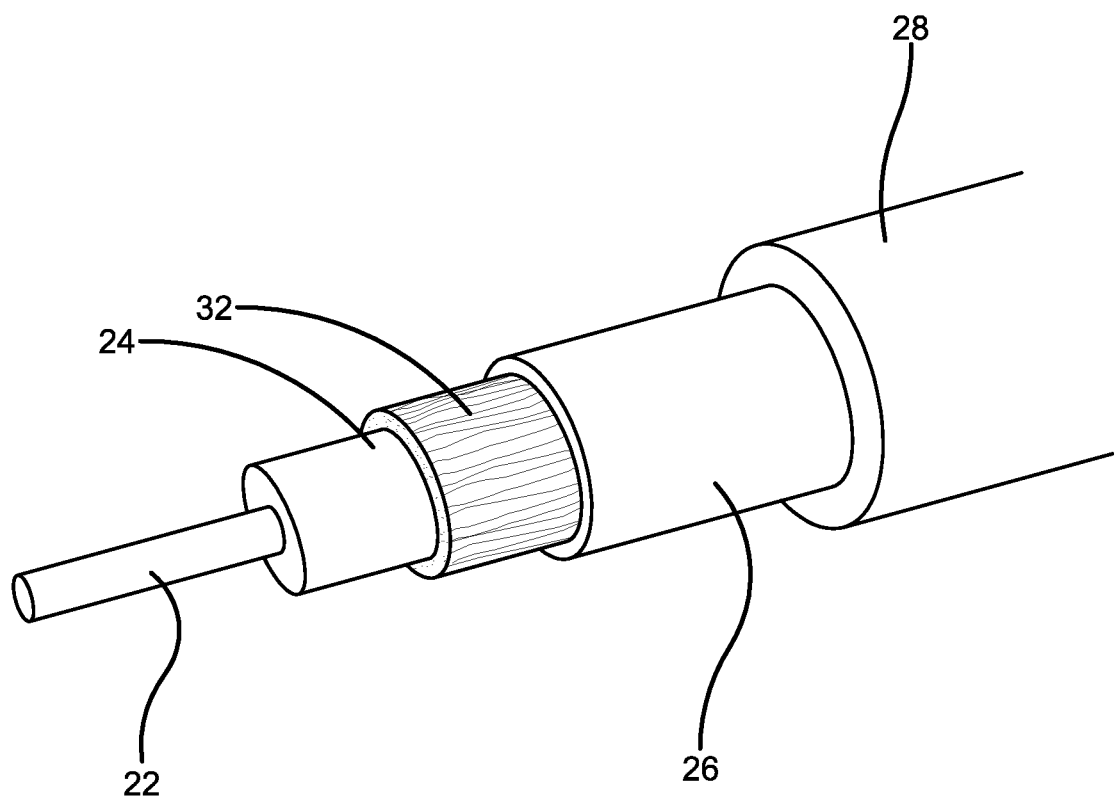
FIG. 8 shows a cut-away view of the wire with a fiber layer.

In reference to the FIGS. 4 and 5, a wire 20 includes a conductor 22, a first ceramifiable layer 24, a second non-ceramifiable layer 26, and an extruded jacket 28. The ceramifiable layer 24 can be a silicone rubber, which, alone, does not have acceptable long term insulation in 90° C. water. It has been found that the silicone insulation over the copper conductor 22 can be coextruded in two layers. The two layers 24, 26, the first a ceramifiable silicone compound, and the second a non-ceramifiable silicone compound, are joined in their uncured state within the co-extrusion tooling (not shown). The layers 24, 26 are applied concentrically and are composed of two concentric layers. In one example, each layer is cured by peroxide curing or addition curing. When cured, the two layers 24, 26 cure together intimately and are inseparable and act as one insulation layer. The first layer 24 is selected from the available wire and cable silicone insulating compounds that are ceramifiable. The second or outer layer 26 is a non-ceramifiable compound and has acceptable 90° C. wet insulation resistance performance. The percentage of the inner layer 24 to the total insulation wall is from about 10% to about 40% (including, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40). A non-limiting example of the silicone compounds used for the layers 24, 26 are non-ceramifiable polydimethylsiloxane and ceramifiable polydimethylsiloxane. A suitable jacket 28, being a thermoplastic, halogen free, fire retardant olefinic material is extruded onto the layers 24, 26. FIG. 8 shows an embodiment wherein fiber reinforcement 32 is between the layers 24, 26.

EXAMPLE

In one example, the non-ceramifiable layer 26 is chosen from Elastosil® 533/60 from Wacker Chemie AG, Xiameter® RBB-2340 Series from Dow Corning Corporation, and any UL class 22 silicone compound. Elastosil® 533/60 is a platinum-crosslinked polydimethylsiloxane, Xiameter® RBB-2340 Series is a peroxide crosslinked polydimethylsiloxane, cured with either 1.3 pph or 1.5 pph 2,4-dichlorobenzoyl peroxide, 50% active, or with 1.0 pph 2,5 Bis(t-butylperoxy)-2,5 dimethylhexane, 45% active, and UL class 22 silicone compounds are silicone compounds as described in Table 50.210 of UL 1581. In this example, the ceramifiable layer 24 is chosen from Elastosil® 502/75 and Elastosil® 512/70, both from Wacker Chemie AG. Elastosil® 502/75 is a ceramifiable HCR (high consistency rubber) silicone, which is a polydimethylsiloxane with vinyl groups, and is crosslinked with 1.8% Bis(2,4-dichlorobenzoyl)peroxide, 50% active, or with 1.2% 2,5 Bis(t-butylperoxy)-2,5 dimethylhexane, 45% active. Elastosil® 512/70 is a ceramifiable HCR silicone, which is a polydimethylsiloxane, and is crosslinked with 1.8% Bis(2,4-dichlorobenzoyl)peroxide, 50% active, or with 1.2% 2,5 Bis(t-butylperoxy)-2,5 dimethylhexane, 45% active. It is to be understood, however, that any ceramifiable silicone compound could be used for the ceramifiable layer 24, and any non-ceramifiable silicone could be used for the non-ceramifiable layer 26.

In one example, the ceramifiable silicone compound is a polydimethylsiloxane and has a density of about 1.05 to about 1.60 g/cm³ (including, but not limited to, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, and 1.60), a Shore A hardness of about 3 to about 90 (including, but not limited to, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90) a tensile strength of about 5 to about 11 N/mm² (including, but not limited to, 5, 6, 7, 8, 9, 10, and 11), an elongation at break of about 100% to about 1,100% (including, but not limited to, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, and 1100), a tear strength of about 5 to about 55 N/mm (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, and 55), a compression set of about 5 to about 25% (including, but not limited to, 5, 6, 7, 8, 9, 10, 11, 12, 13, 14, 15, 16, 17, 18, 19, 20, 21, 22, 23, 24, and 25), and a rebound resilience of about 30% to about 70% (including, but not limited to, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70). In another example, the ceramifiable silicone compound is a polydimethylsiloxane and has a density of about 1.20 to about 1.29 g/cm³ (including, but not limited to, 1.20, 1.21, 1.22, 1.23, 1.24, 1.25, 1.26, 1.27, 1.28, and 1.29), a Shore A hardness of about 70 to about 72 (including, but not limited to, 70, 71, and 72), a tensile strength of about 6.6 to about 9 N/mm² (including, but not limited to, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, and 9.0), an elongation at break of about 330% to about 430% (including, but not limited to, 330, 340, 350, 360, 370, 380, 390, 400, 410, 420, and 430), and a tear strength of about 18 to about 26 N/mm (including, but not limited to, 18, 19, 20, 21, 22, 23, 24, 25, and 26).

Table 1 below shows the failure of a single ceramifiable insulation layer within a month.

TABLE 1

| | UL Sample - ceramifiable rubber (100%, No Liner, No Tape) Failed Sample Returned From UL | | |
|---|---|---|---|
| | Meter (GΩ) | Decrease % | IR (MΩ · 1000 ft) |
| Day 1 | 9.570 | 0.00% | 478.50 |
| Day 4 | 0.897 | 90.63% | 44.85 |
| Day 8 | 0.011 | 98.74% | 0.57 |
| Day 35 | Failure | | |

Table 2 below shows the data from testing of the co-extruded, non-ceramifiable/ceramifiable layer. Good performance is seen for multiple months, reaching a point of stabilization.

TABLE 2

| | ceramifiable rubber/"B" rubber Dual Extrusion ~0.160" OD | | | ceramifiable rubber/"B" rubber Dual Extrusion ~0.160" OD Low Vacuum Thin Inner Black | | | ceramifiable rubber/"B" rubber Dual Extrusion ~0.160" OD | | |
|---|---|---|---|---|---|---|---|---|---|
| | Meter (GΩ) | Decrease % | IR (MΩ · 1000 ft) | Meter (GΩ) | Decrease % | IR (MΩ · 1000 ft) | Meter (GΩ) | Decrease % | IR (MΩ · 1000 ft) |
| Day 1 | 13.800 | 0.00% | 690.00 | | | | 14.600 | 0.00% | 730.00 |
| Day 6 | 7.960 | 42.32% | 398.00 | | | | 4.440 | 69.59% | 222.00 |
| Day 8 | 7.730 | 2.89% | 386.50 | | | | 3.530 | 20.50% | 176.50 |
| Day 16 | 2.350 | 69.60% | 117.50 | | | | 0.675 | 80.88% | 33.75 |
| Day 20 | 0.572 | 75.66% | 28.60 | | | | 0.478 | 29.19% | 23.90 |
| Day 23 | 0.269 | 52.97% | 13.45 | | | | 0.100 | 79.16% | 4.98 |
| Day 27 | 0.074 | 72.68% | 3.68 | | | | 0.068 | 31.93% | 3.39 |
| Day 30 | 0.089 | −20.41% | 4.43 | | | | 0.036 | 46.31% | 1.82 |

TABLE 2-continued

| | ceramifiable rubber/"B" rubber Dual Extrusion ~0.160" OD | | | ceramifiable rubber/"B" rubber Dual Extrusion ~0.160" OD Low Vacuum Thin Inner Black | | | ceramifiable rubber/"B" rubber Dual Extrusion ~0.160" OD | | |
|---|---|---|---|---|---|---|---|---|---|
| | Meter (GΩ) | Decrease % | IR (MΩ · 1000 ft) | Meter (GΩ) | Decrease % | IR (MΩ · 1000 ft) | Meter (GΩ) | Decrease % | IR (MΩ · 1000 ft) |
| Day 35 | 0.097 | −9.94% | 4.87 | | | | 0.028 | 24.18% | 1.38 |
| Day 42 | 0.049 | 49.54% | 2.46 | | | | 0.025 | 10.14% | 1.24 |
| Day 49 | 0.068 | −37.47% | 3.38 | | | | 0.019 | 22.58% | 0.96 |
| Day 52 | 0.063 | 6.07% | 3.17 | | | | 0.018 | 8.85% | 0.88 |
| Day 56 | 0.058 | 8.52% | 2.90 | | | | 0.012 | 33.14% | 0.59 |
| Day 59 | 0.048 | 17.07% | 2.41 | | | | 0.010 | 11.97% | 0.52 |
| Day 63 | 0.046 | 4.99% | 2.29 | | | | 0.010 | 3.40% | 0.50 |
| Day 66 | 0.050 | −8.53% | 2.48 | | | | 0.011 | −5.53% | 0.53 |
| Day 70 | 0.048 | 3.02% | 2.41 | 10.200 | 0.00% | 510.00 | 0.010 | 3.81% | 0.51 |
| Day 73 | 0.047 | 2.29% | 2.35 | 6.030 | 40.88% | 301.50 | 0.011 | −8.91% | 0.55 |
| Day 77 | 0.044 | 7.02% | 2.19 | 2.940 | 51.24% | 147.00 | 0.011 | 4.55% | 0.53 |
| Day 80 | 0.039 | 11.21% | 1.94 | 0.711 | 75.82% | 35.55 | 0.011 | −6.67% | 0.56 |
| Day 84 | 0.033 | 15.72% | 1.64 | 0.151 | 78.76% | 7.55 | 0.010 | 10.71% | 0.50 |
| Day 87 | 0.029 | 10.40% | 1.47 | 0.028 | 81.66% | 1.39 | 0.010 | 0.80% | 0.50 |
| Day 91 | 0.024 | 17.06% | 1.22 | 0.029 | −5.78% | 1.47 | 0.010 | 0.91% | 0.49 |
| Day 94 | 0.022 | 9.47% | 1.10 | 0.017 | 40.61% | 0.87 | 0.010 | −1.63% | 0.50 |
| Day 106 | 0.021 | 5.00% | 1.05 | 0.016 | 5.75% | 0.82 | 0.008 | 23.92% | 0.38 |
| Day 111 | 0.018 | 12.92% | 0.91 | 0.010 | 39.02% | 0.50 | 0.007 | 8.16% | 0.35 |
| Day 114 | 0.016 | 14.84% | 0.78 | 0.010 | −1.00% | 0.51 | 0.007 | −5.44% | 0.37 |
| Day 118 | 0.015 | 3.23% | 0.75 | 0.007 | 26.83% | 0.37 | 0.007 | 7.88% | 0.34 |
| Day 122 | Monitoring | Stopped | | 0.0005 | 28.69% | 0.26 | 0.006 | 12.98% | 0.30 |
| Day 125 | | | | 0.005 | −0.57% | 0.27 | 0.006 | 0.68% | 0.29 |
| Day 129 | | | | 0.005 | 1.13% | 0.26 | 0.006 | 2.05% | 0.29 |
| Day 136 | | | | 0.005 | 0.19% | 0.26 | 0.006 | −8.54% | 0.31 |
| Day 139 | | | | 0.005 | 8.80% | 0.24 | 0.006 | 10.27% | 0.28 |
| Day 145 | | | | 0.005 | 1.47% | 0.24 | 0.005 | 12.16% | 0.25 |
| Day 148 | | | | 0.005 | 4.26% | 0.23 | 0.005 | 3.87% | 0.24 |
| Day 153 | | | | 0.004 | 7.78% | 0.21 | 0.004 | 5.08% | 0.22 |

Tables 3 and 4 below show a test for current leakage. Table 3 shows the current leakage of surviving single extrusion samples at 1850° F. at the end of a two hour fire test. Table 4 shows the current leakage of dual extrusion samples at 1850° F. at the end of a two hour fire test. The dual extrusion improves current leakage significantly. The inclusion of mica under the dual extrusion as shown in Circuit #6 of table 4 actually increased current leakage.

TABLE 3

Current leakage of surviving single extrusion samples at 1850° F. at the end of a two hour fire test

| Current Transducer | Current Leakage (mA) | Voltage Transducer | Circuit |
|---|---|---|---|
| 0.46 | 150.74 | 0.23 | Circuit 1 |
| 0.73 | 166.08 | 0.48 | 353.12 |
| 0.82 | 178.09 | 0.55 | |
| 0.72 | 158.08 | 0.48 | Circuit 2 |
| 0.67 | 148.74 | 0.44 | 342.37 |
| 0.77 | 147.41 | 0.55 | |
| 0.00 | 0.00 | 0.00 | Circuit 3 |
| 0.00 | 0.00 | 0.00 | 335.23 |
| 0.00 | 0.00 | 0.00 | |
| 0.73 | 173.42 | 0.47 | Circuit 4 |
| 0.77 | 173.42 | 0.51 | 335.29 |
| 0.00 | 2.00 | 0.00 | |
| 0.62 | 94.05 | 0.48 | Circuit 5 |
| 0.00 | 0.00 | 0.00 | 342.79 |
| 0.00 | 0.00 | 0.00 | |
| 0.73 | 130.07 | 0.54 | Circuit 6 |
| 0.75 | 133.40 | 0.55 | 353.24 |
| 0.00 | 0.00 | 0.00 | |

TABLE 4

Current leakage of dual extrusion samples at 1850° F. at the end of a two hour fire test.

| Current Transducer | Current Leakage (mA) | Voltage Transducer | Circuit |
|---|---|---|---|
| 0.48 | 58.03 | 0.39 | Circuit 1 |
| 0.52 | 57.36 | 0.43 | 274.70 |
| 0.00 | 5.34 | 0.01 | |
| 0.50 | 45.36 | 0.43 | Circuit 2 |
| 0.58 | 82.04 | 0.45 | 274.88 |
| 0.56 | 90.71 | 0.42 | |
| 0.56 | 85.38 | 0.43 | Circuit 3 |
| 0.00 | 12.67 | 0.02 | 273.02 |
| 0.00 | 0.00 | 0.00 | |
| 0.00 | 0.00 | 0.00 | Circuit 4 |
| 0.00 | 0.67 | 0.00 | 272.72 |
| 0.46 | 58.70 | 0.37 | |
| 0.49 | 46.02 | 0.42 | Circuit 5 |
| 0.00 | 0.00 | 0.00 | 274.04 |
| 0.48 | 39.35 | 0.42 | |
| 0.00 | 0.67 | 0.00 | Circuit 6 |
| 0.64 | 144.07 | 0.43 | 272.72 |
| 0.62 | 132.07 | 0.42 | |

It is to be understood that the wire can be made in at least the following ways: a non-ceramifiable layer co-extruded with a second ceramifiable layer on top; a non-ceramifiable layer co-extruded with a second ceramifiable layer on top, then covered with an extruded jacket; a ceramifiable layer co-extruded with a second non-ceramifiable layer on top; a ceramifiable layer co-extruded with a second non-ceramifiable layer on top, then covered with an extruded jacket; a non-ceramifiable layer co-extruded with a second ceramifiable layer on top, wherein no mica is used; a non-ceramifiable layer co-extruded with a second ceramifiable layer on top, then covered with an extruded jacket, wherein no mica is used; a ceramifiable layer co-extruded with a second non-ceramifiable layer on top, wherein no mica is used; and a ceramifiable layer co-extruded with a second non-ceramifiable layer on top, then covered with an extruded jacket, wherein no mica is used. In all of the previous iterations, the fiber layer can be applied between the first and second insulation layers.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the presently preferred embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

I claim:

1. An electric wire comprising:
   a metal conductor;
   a first insulation layer, wherein the first layer is a non-ceramifiable silicone compound;
   a second insulation layer, wherein the second layer is a ceramifiable silicone compound, wherein the second layer is on the outside of the first layer, wherein no mica is used in the second insulation layer, wherein the first layer is between about 5 mils and about 15 mils and the second layer is between about 30 mils and about 40 mils; and,
   an extruded jacket, wherein the extruded jacket surrounds the first and second insulation layers.

2. The wire of claim 1, wherein the first and second layer are coextruded into inseparable layers, wherein no mica is used in the first insulation layer.

3. The wire of claim 2, wherein the first layer has an acceptable 90° C. wet insulation resistance performance and acceptable current leakage performance at 1850° F.

4. The wire of claim 2, wherein the first layer has a diameter of between about 10% to about 40% of the diameter of the combined first and second layers.

5. The wire of claim 4, wherein the minimum thickness of the layers is about 40 mils.

6. The wire of claim 4, wherein the first layer is between about 10 mils to about 12 mils and the second layer is about 20 mils.

7. The wire of claim 1, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$.

8. The wire of claim 1, wherein the first insulation layer is addition or peroxide crosslinked.

9. The wire of claim 8, wherein the second insulation layer is addition cured or peroxide crosslinked.

10. The wire of claim 9, wherein the silicone compound of the first and second insulation layers is a polyorganosiloxane and is crosslinked with a peroxide compound or a crosslinking agent.

11. The wire of claim 10, wherein the ceramifiable silicone compound is a polydimethylsiloxane and has a density of about 1.05 to about 1.60 g/cm$^3$, a Shore A hardness of about 3 to about 90, a tensile strength of about 5 to about 11 N/mm$^2$, an elongation at break of about 100% to about 1,100%, a tear strength of about 5 to about 55 N/mm, a compression set of about 5 to about 25%, and a rebound resilience of about 30% to about 70%.

12. The wire of claim 11, wherein the ceramifiable silicone compound is a polydimethylsiloxane and has a density of about 1.20 to about 1.29 g/cm$^3$, a Shore A hardness of about 70 to about 72, a tensile strength of about 6.6 to about 9 N/mm$^2$, an elongation at break of about 330% to about 430%, and a tear strength of about 18 to about 26 N/mm.

13. The wire of claim 8, wherein the non-ceramifiable silicone compound is a polyorganosiloxane.

14. The wire of claim 13, wherein the non-ceramifiable silicone compound is a polydimethylsiloxane.

15. The wire of claim 1, wherein the jacket is thermoplastic.

16. The wire of claim 1, wherein the wire further comprises a fiber reinforcement between the two silicone insulation layers.

17. An electric wire comprising:
   a metal conductor, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$;
   a first insulation layer, wherein the first layer is a non-ceramifiable platinum-crosslinked polydimethylsiloxane, wherein the first layer is between about 10 mils to about 12 mils, wherein the first layer has an acceptable 90° C. wet insulation resistance performance;
   a second insulation layer, wherein the second layer is a ceramifiable peroxide-crosslinked polydimethylsiloxane, wherein the second layer is on the outside of the first layer, wherein the second layer is about 35 mils, wherein the first and second layer are coextruded into inseparable layers, wherein the thickness of the layers is a minimum of about 40 mils, wherein no mica is used in the second insulation layer; and,
   a thermoplastic, halogen free, fire-retardant, olefinic extruded jacket, wherein the extruded jacket covers the layers.

18. An electric wire comprising:
   a metal conductor, wherein the metal conductor is chosen from the group comprising stranded copper, stranded silver plated copper, stranded nickel plated copper, stranded nickel, solid copper, solid silver plated copper, solid nickel plated copper, and solid nickel, wherein the conductor has a cross sectional area between about 0.823 mm$^2$ and about 253.35 mm$^2$, wherein the second layer is directly on the outside of the first layer;
   a first insulation layer, wherein the first layer is a ceramifiable silicone compound, wherein no mica is used in the first insulation layer;
   a second insulation layer, wherein the second layer is a non-ceramifiable silicone compound, wherein the second layer is on the outside of the first layer, wherein the thickness of the layers can be as low as about 40 mils; and an extruded jacket, wherein the extruded jacket surrounds the first and second insulation layers.

19. The wire of claim 18, wherein the first and second layers are coextruded into inseparable layers, wherein no mica is used in the second insulation layer.

20. The wire of claim 19, wherein the second layer has an acceptable 90° C. wet insulation resistance performance and acceptable current leakage performance at 1850° F.

21. The wire of claim 19, wherein the two silicone layers are applied in two separate extrusion layers and inseparably bonded together.

22. The wire in claim number 19 where a third silicone layer is applied over the first two extruded layers, wherein the extruded jacket surrounds the first, second, and third silicone layers.

23. The wire of claim 18, wherein the layers are addition or peroxide crosslinked.

24. The wire of claim 23, wherein the ceramifiable silicone compound is a polydimethylsiloxane and has a density of about 1.05 to about 1.60 g/cm$^3$, a Shore A hardness of about 3 to about 90, a tensile strength of about 5 to about 11 N/mm$^2$, an elongation at break of about 100% to about 1,100%, a tear strength of about 5 to about 55 N/mm, a compression set of about 5 to about 25%, and a rebound resilience of about 30% to about 70%.

25. The wire of claim 24, wherein the non-ceramifiable silicone compound is a polyorganosiloxane.

26. The wire of claim 18, wherein the wire further comprises a fiber reinforcement between in the two silicone insulation layers.

* * * * *